(12) United States Patent
Abbott

(10) Patent No.: US 12,091,149 B2
(45) Date of Patent: Sep. 17, 2024

(54) AERIAL VEHICLE FOR CARRYING A PAYLOAD

(71) Applicant: Abbott Aerospace Canada Ltd., Collingwood (CA)

(72) Inventor: Richard Paul Abbott, Collingwood (CA)

(73) Assignee: Abbott Aerospace Canada Ltd., Collingwood (CA)

( * ) Notice: Subject to any disclaimer, the term of this patent is extended or adjusted under 35 U.S.C. 154(b) by 129 days.

(21) Appl. No.: 17/225,352

(22) Filed: Apr. 8, 2021

(65) Prior Publication Data

US 2022/0324561 A1  Oct. 13, 2022

(51) Int. Cl.
*B64C 29/02* (2006.01)
*B64C 3/14* (2006.01)
*B64C 9/00* (2006.01)
*B64D 9/00* (2006.01)
*B64D 27/24* (2006.01)
(Continued)

(52) U.S. Cl.
CPC ............... *B64C 29/02* (2013.01); *B64C 3/14* (2013.01); *B64C 9/00* (2013.01); *B64D 9/00* (2013.01); *B64D 27/24* (2013.01); *B64U 10/20* (2023.01); *B64U 20/40* (2023.01); *B64U 30/14* (2023.01); *B64U 30/295* (2023.01); *B64U 50/13* (2023.01); *B64U 60/70* (2023.01); *B64C 2009/005* (2013.01); *B64C 2211/00* (2013.01); *B64D 7/00* (2013.01); *B64U 20/60* (2023.01);
(Continued)

(58) Field of Classification Search
CPC ... B64C 39/10; B64C 2039/105; B64C 29/02; B64C 9/38
See application file for complete search history.

(56) References Cited

U.S. PATENT DOCUMENTS 2,108,093 A   2/1938  Zimmerman
2,403,838 A   7/1946  Zimmerman
(Continued)

OTHER PUBLICATIONS

Line.17qq.com. "Border Patrol and Small Fixed-Wing Drones (p. 6)" [online], Webpage: <https://line.17qq.com/articles/qhwmqqgpsy_p6.html> (accessed on May 3, 2021), publication available before Apr. 8, 2021, 3 pages.
(Continued)

*Primary Examiner* — Nicholas McFall
*Assistant Examiner* — Terri L Filosi
(74) *Attorney, Agent, or Firm* — Heer Law; Stephano Salani

(57) ABSTRACT

The present specification relates generally to unmanned aerial vehicles, and specifically to a vertical take-off and lift unmanned aerial vehicle configured for high speed, long-distance flight, and vertical take-off and lift, while carrying a significant payload. The aerial vehicle includes a first propeller and a second propeller, each comprising at least two blades and each disposed on opposite lateral edges of the aerial vehicle; a tail segment forming a trailing edge of the aerial vehicle, wherein the tail segment comprises: an elevator; and a first wing and a second wing, each comprising an aileron. The aerial vehicle further includes four fins, wherein the four fins are affixed to lateral edges behind the first propeller or the second propeller and configured as endplates; a motor; and a power supply.

10 Claims, 15 Drawing Sheets

(51) Int. Cl.
B64U 10/20 (2023.01)
B64U 20/40 (2023.01)
B64U 30/14 (2023.01)
B64U 30/295 (2023.01)
B64U 50/13 (2023.01)
B64U 60/70 (2023.01)
B64D 7/00 (2006.01)
B64U 20/60 (2023.01)
B64U 50/19 (2023.01)
B64U 101/15 (2023.01)
B64U 101/31 (2023.01)
F42B 23/24 (2006.01)

(52) U.S. Cl.
CPC .......... *B64U 50/19* (2023.01); *B64U 2101/15* (2023.01); *B64U 2101/31* (2023.01); *F42B 23/24* (2013.01)

(56) References Cited

U.S. PATENT DOCUMENTS

| | | | |
|---|---|---|---|
| 2,411,770 | A | 11/1946 | Zimmerman |
| 2,431,293 | A | 11/1947 | Zimmerman |
| 2,438,309 | A | 3/1948 | Zimmerman |
| 2,452,281 | A | 10/1948 | Zimmerman |
| 2,462,824 | A | 2/1949 | Zimmerman |
| 2,462,825 | A | 2/1949 | Zimmerman |
| 2,577,065 | A | 12/1951 | Zimmerman |
| 2,972,949 | A | 2/1961 | MacLeod |
| 3,216,673 | A * | 11/1965 | Alter ........................ B60V 1/08 244/102 R |
| 5,082,204 | A * | 1/1992 | Croston ................. B64C 39/066 244/89 |
| 8,613,241 | B2 | 12/2013 | Martinez |
| 9,074,843 | B1 | 7/2015 | Montgomery |
| 2002/0145075 | A1* | 10/2002 | Page ........................ B64C 39/10 244/36 |
| 2016/0047640 | A1 | 2/2016 | Chung |
| 2017/0327219 | A1* | 11/2017 | Alber ..................... B64D 27/24 |
| 2019/0100303 | A1* | 4/2019 | Campbell ............... B64C 27/26 |
| 2019/0118935 | A1* | 4/2019 | Love ....................... B64C 11/18 |
| 2021/0253239 | A1* | 8/2021 | Ivans ..................... B64C 29/02 |

OTHER PUBLICATIONS

Fly Dragon Drone Tech. "FLY-380 VTOL" [online], Webpage: <http://www.dronefromchina.com/product/FLY-380-VTOL.html> (accessed on May 3, 2021), publication available before Apr. 8, 2021, 4 pages.

SUAS News. "Skyfront Sets World Record for Drones with 4 hour and 34 minute flight" [online], Webpage: <https://www.suasnews.com/2017/09/skyfront-sets-world-record-for-drones-with-4-hour-and-34-minute-flight/> (accessed on May 3, 2021), published on Sep. 14, 2017, 2 pages.

\* cited by examiner

AERIAL VEHICLE FOR CARRYING A PAYLOAD

FIELD

The present specification relates generally to aerial vehicles, and specifically to aerial vehicles able to carry a payload.

BACKGROUND

Unmanned aerial vehicles (UAVs) are useful, and the applications to which UAVs may be put are many. Recreational operators often use UAVs to take larger-than-life photos and videos, big businesses have recognized their utility in the context of making deliveries to customers, and military users may use UAVs to execute, for example, reconnaissance missions while keeping personnel out of harm's way.

UAVs may be complex to control, lack aerodynamic stability, and may not have sufficient payload capacity. UAVs may lack desired performance levels and are configured for low speed and high endurance.

Accordingly, there remains a need for improvements in the art.

SUMMARY

In an embodiment of the present invention, there is provided an aerial vehicle, comprising a first propeller and a second propeller, each comprising at least two blades and each disposed on opposite lateral edges of the aerial vehicle; a tail segment forming a trailing edge of the aerial vehicle, wherein the tail segment comprises an elevator; and a first wing and a second wing, each comprising an aileron. The aerial vehicle further comprises four fins, wherein the four fins are affixed to the lateral edges behind the first propeller or the second propeller and configured as endplates; a motor; and a power supply.

In an embodiment, there is provided a method of transitioning an aerial vehicle from hovering to forward flight, comprising with a pair of propellers active, and the aerial vehicle suspended, deflecting an elevator on a tail section of the aerial vehicle; and once the aerial vehicle assumes a horizontal orientation, returning the elevator to a neutral position.

In accordance with an aspect, there is provided an aerial vehicle, including: a first propeller and a second propeller, each comprising at least two blades and each disposed on opposite lateral edges of the aerial vehicle; a tail segment forming a trailing edge of the aerial vehicle, wherein the tail segment comprises: an elevator; and a first wing and a second wing, each comprising an aileron. The aerial vehicle further includes four fins, wherein the four fins are affixed to lateral edges immediately aft of the first propeller or the second propeller and configured as endplates; a motor; and a power supply.

In some embodiments, the aerial vehicle further includes a body between the first propeller and the second propeller, wherein the body comprises a removable payload section forming the leading edge.

In some embodiments, the body is detachable from the first propeller and from the second propeller.

In some embodiments, the removable payload section is configured to accommodate at least one directional fragmentation mine.

In some embodiments, each of the fins are positioned to support the aerial vehicle in a tail-sitting configuration.

In some embodiments, the motor and the power supply are housed in the first propeller or the second propeller.

In some embodiments, the motor and the power supply are housed in the tail segment.

In some embodiments, the first propeller and the second propeller are detachable from the tail segment.

In some embodiments, the first wing and the second wing each are back-swept wings.

In some embodiments, two of the four fins are disposed on opposite faces of the first propeller and wherein another two of the four fins are disposed on opposite faces of the second propeller.

In some embodiments, an aspect ratio of a wingspan of the aerial vehicle to the chord has an aspect ratio less than 2.0.

In accordance with an aspect, there is provided a method of transitioning an aerial vehicle from hovering to forward flight, including: with a pair of propellers active, and the aerial vehicle suspended, deflecting an elevator on a tail section of the unmanned aerial vehicle; and once the aerial vehicle assumes a horizontal orientation, returning the elevator to a neutral position.

Other aspects and features according to the present application will become apparent to those ordinarily skilled in the art upon review of the following description of embodiments of the invention in conjunction with the accompanying figures.

BRIEF DESCRIPTION OF THE DRAWINGS

The principles of the invention may better be understood with reference to the accompanying figures provided by way of illustration of an exemplary embodiment, or embodiments, incorporating principles and aspects of the present invention, and in which.

DETAILED DESCRIPTION OF EMBODIMENTS

Figure 1:
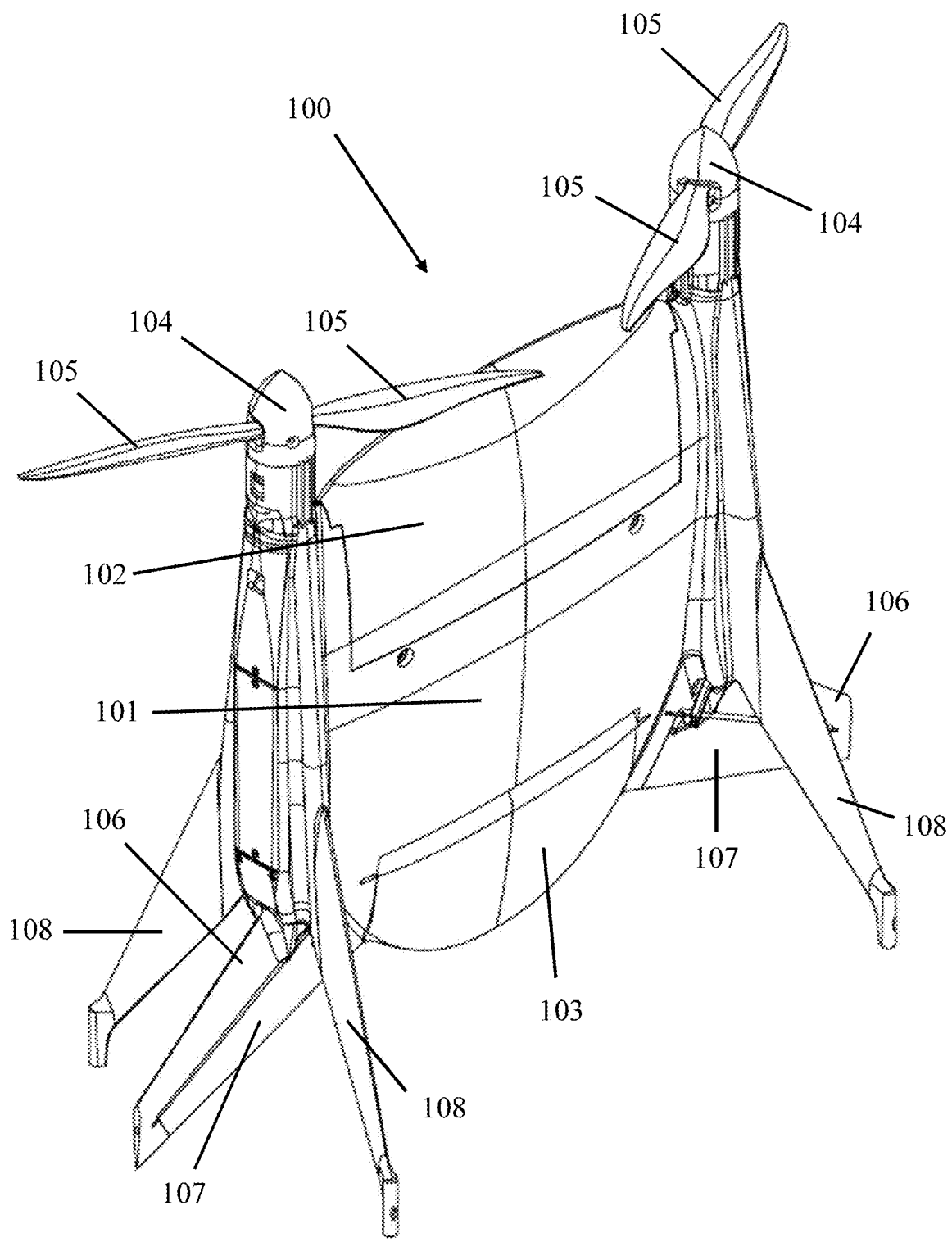
FIG. 1 is a right side perspective view of an aerial vehicle, according to an embodiment.
Figure 2:
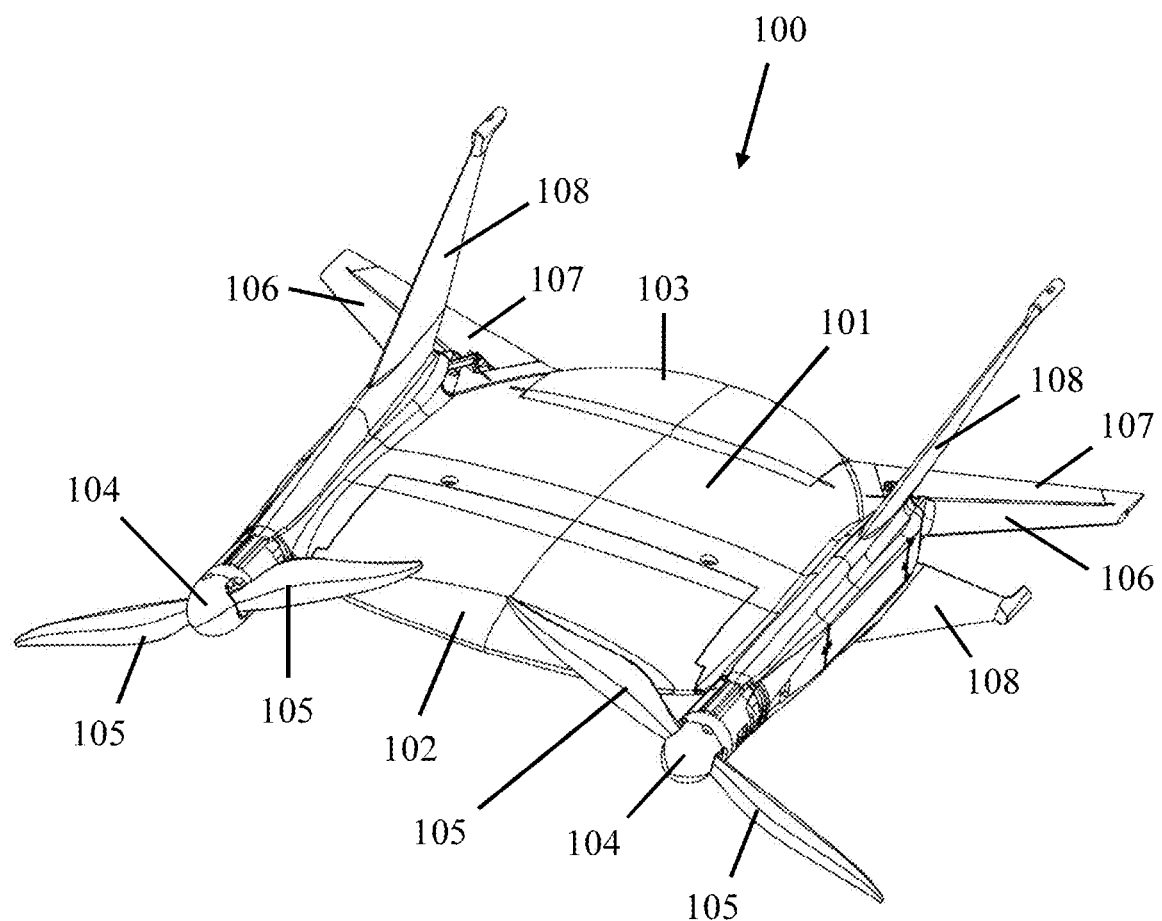
FIG. 2 is a left side perspective view of the aerial vehicle of FIG. 1, rotated 90 degrees about an axis.
Figure 3:
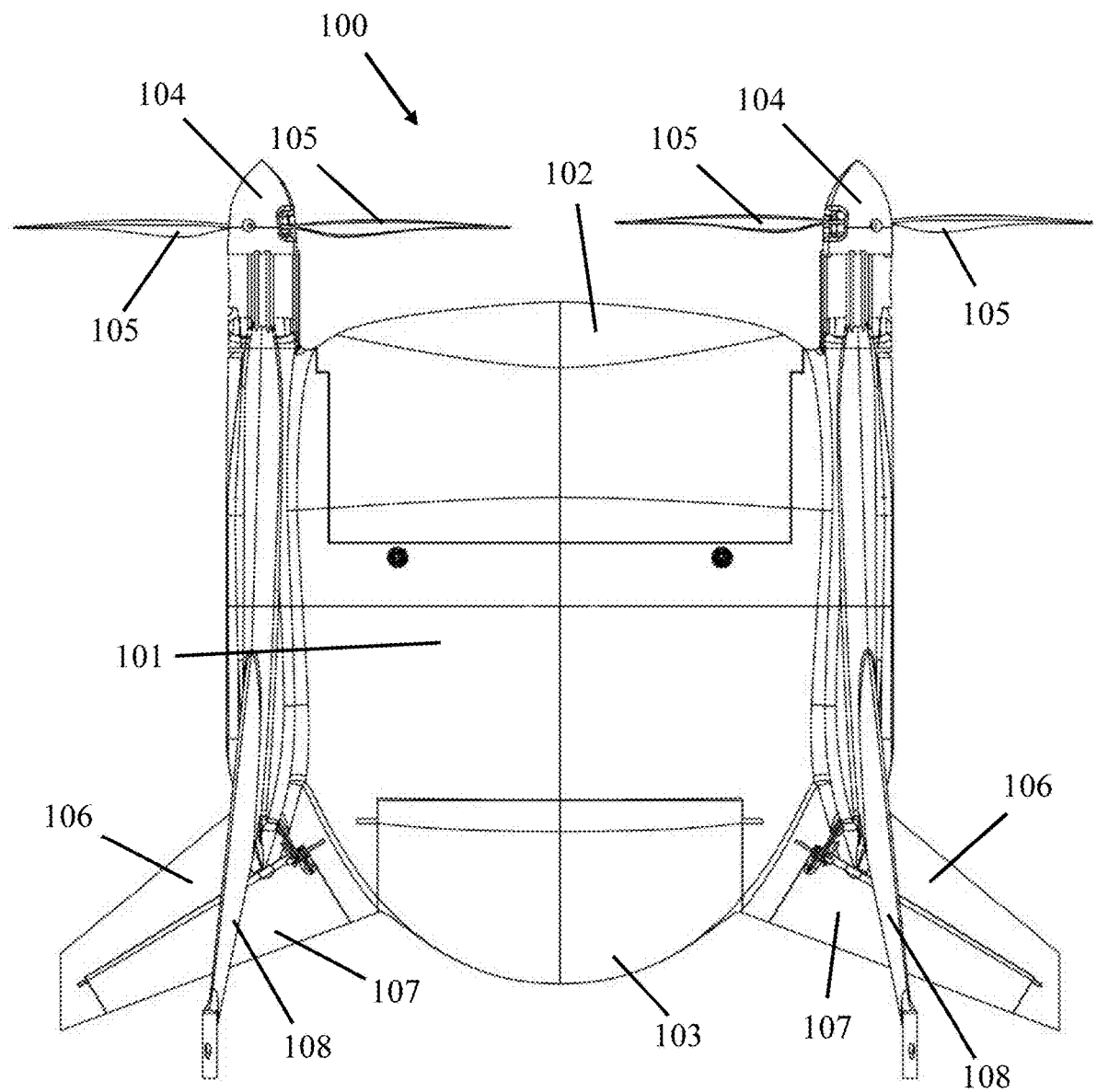
FIG. 3 is a back view of the aerial vehicle of FIG. 1.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order more clearly to depict certain features of the invention.

Some UAVs can fall into one of two categories: multi-rotor UAVs and fixed-wing UAVs. Multi-rotor UAVs are vertical take-off and lift air vehicles optimized for ease of use. These UAVs have low endurance, low flight speeds, and limited payload capacity. Further, due to a lack of aerodynamic stability, these aircraft rely on control and adjustment by software to maintain stable, controlled flight. These aircraft are therefore both mechanically complex and especially sensitive to damage or mishandling.

Fixed-wing UAVs, unlike multi-rotor UAVs, are optimized for endurance, but have low flight speeds. These UAVs use traditional wings and have large wing spans. Although some fixed-wing UAVs possess vertical take-off and lift ability through a set of separate lift rotors, these rotors produce drag, thereby degrading cruise performance, and limit payload capacity due to the resulting increase in the overall weight of the UAV.

Neither category of UAVs possesses the combined capacity for high speed, long-distance flight, and vertical take-off and lift, while carrying a significant payload, such as provided by embodiments described herein. Embodiments can carry a variety of different payloads, such as Claymore type munition, from a vertical takeoff at high speed over a long distance with an ability to loiter in a high endurance conventional flight circuit or a stationary hover and be deployed on a selected target or returned to the user for later deployment. Embodiments can provide sufficient speed and be shaped so as to allow it to provide a delivery system for using a Claymore type device as an offensive weapon. Embodiments are configured geometrically and aerodynamically and can allow vertical take-off and transition of the whole body of the aerial vehicle to a high-speed efficient cruise, as well as allow hovering and transition between flight modes such as forward flight, vertical take-off, and hover.

Figure 8:
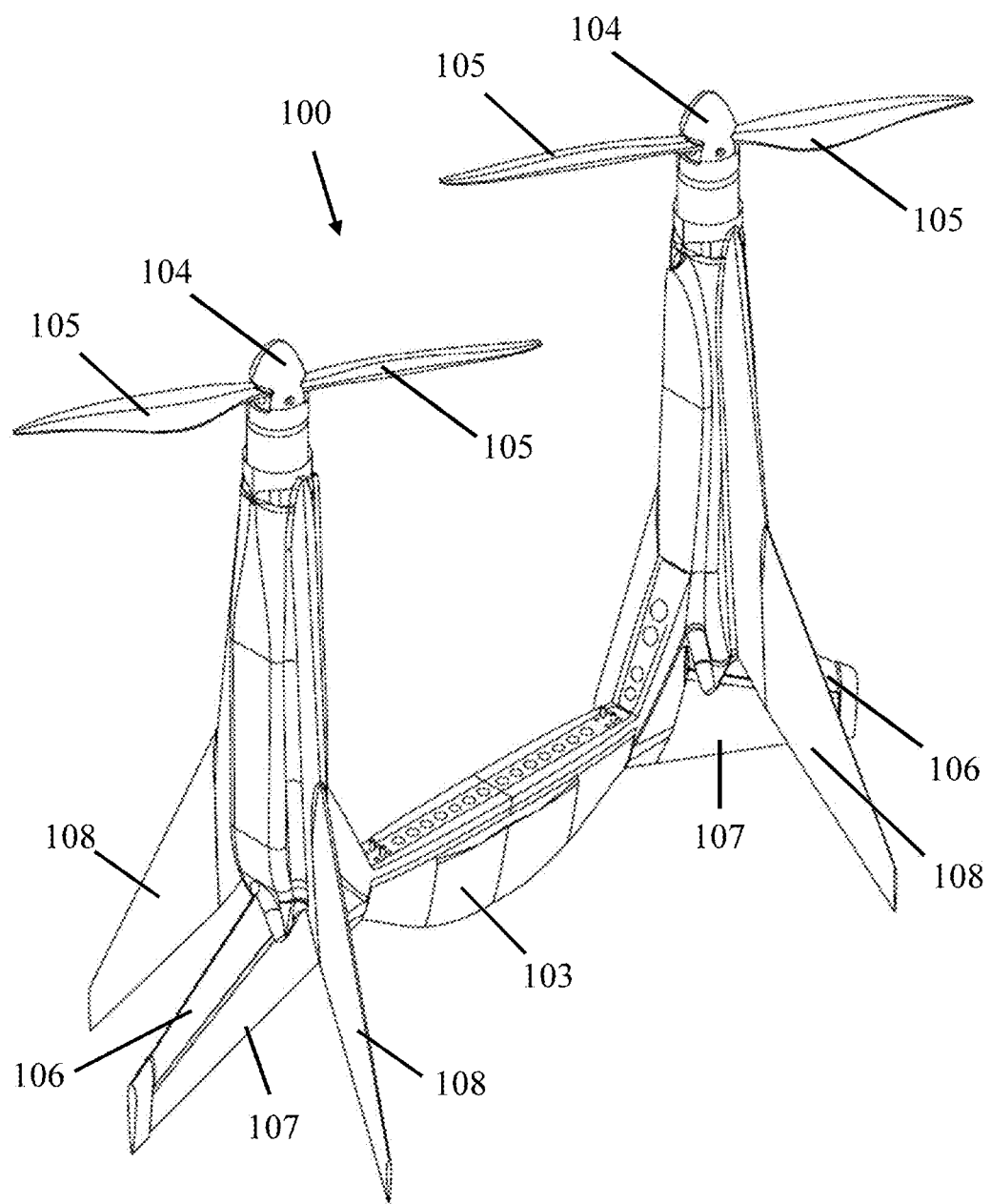
FIG. 8 is a left side perspective view of an aerial vehicle, according to an embodiment.
Figure 9:
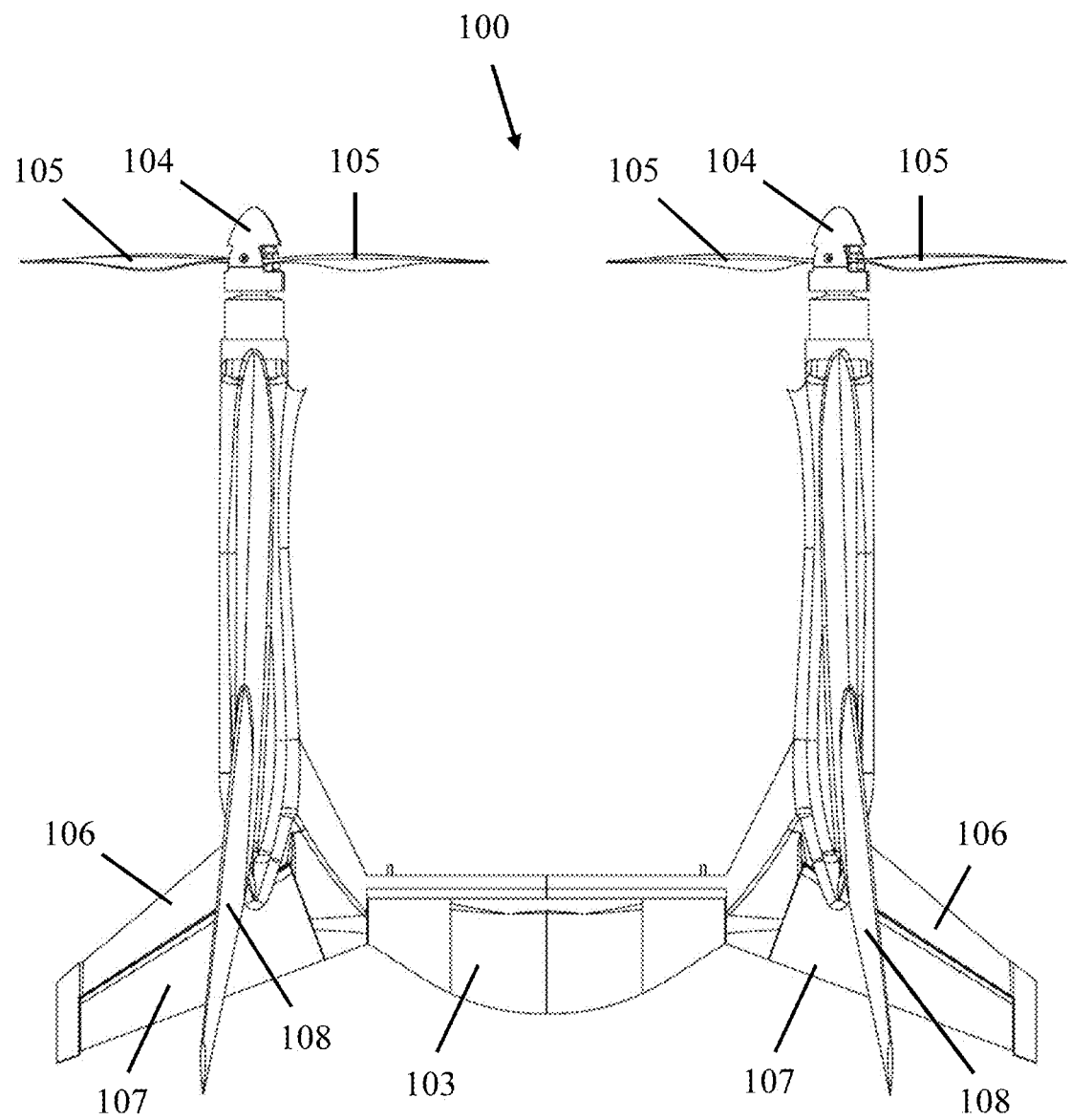
FIG. 9 is a back view of an aerial vehicle, according to an embodiment.

Aerial vehicle 100 includes a first propeller 104 and a second propeller 104. The first propeller 104 and the second propeller 104 can be connected to or attached to a primary wing such as a wing-fuselage that includes the leading edge and extends toward the trailing edge. The primary wing can generate the primary lift for the aerial vehicle 100. In some embodiments, a body section of the primary wing can be detached and the aerial vehicle 100 can be flown in vertical flight without the body section. The body section can include a payload section at the leading edge. The body section can be connected to each of the propellers 104. According to an embodiment as shown in FIG. 8, the aerial vehicle 100 can have a removable body section detached.

The aerial vehicle 100 can have a wingspan extending from the first lateral edge to the second lateral edge. The aerial vehicle 100 has a low aspect ratio wing, such as a 1:1 aspect ratio of the wingspan to the chord. The primary wing can have an aspect ratio of 1:1. Other aspect ratios are possible, such as aspect ratio that are above or below 1:1, such as 1.5:1. As the aspect ratio is increased, the positive effect of having the propellers 104 at the outer edges (tips) of the primary wing (lateral edges of aerial vehicle 100) is reduced. The shorter the aspect ratio the greater the issue of the tip vortex and the greater positive effect of having the propellers 104 at the wingtips. The propellers 104 so positioned can reduce wing tip vortex at the respective lateral edges and reduce induced drag force. Aerial vehicle 100 can maintain a fully blown surface in view of the low aspect ratio wing and large diameter propellers. As the aspect ratio increases, the propellers 104 are increased in diameter to fully effect the flying surface or more propellers 104 are added to aerial vehicle 100.

The aerial vehicle 100 includes a tail segment that includes the trailing edge. The tail segment can be included as part of the primary wing. The tail segment includes an elevator 103, as well as includes a first wing 106 and a second wing 106 at opposite sides of the elevator 103. The first wing 106 and the second wing 106 can each extend laterally and rearwardly from the aerial vehicle 100 and can each have an aileron 107. The ailerons can be sized for adequate roll control, and this can be achieved in a variety of ways.

The aerial vehicle 100 can move in vertical flight, in horizontal flight, in both, and can transition between each, for example. For example, the whole body of aerial vehicle can transition by rotating about 90 degrees and the same propellers 104 can be used for hovering flight and forward flight.

The aerial vehicle 100 includes four fins 108. The first fin 108 and the second fin 108 each extend up to the first propeller 104 such as up to a position at the leading edge and/or up to a position near the blade(s) at the tip of the first propeller 104, as well as beyond the trailing edge of the aerial vehicle 100. The first fin 108 is at an angle above the lateral edge that the first propeller 104 is positioned along, and the second fin 108 extends at an angle below the same lateral edge. The angle of the fins 108 is defined to create adequate stability when the vehicle is resting on the fin tips on the ground. The angle defines the footprint when in the tail-sitting position.

Each of the fins 108 can be used to support the aerial vehicle 100 in a tail-sitting position. Each of the fins 108 are affixed to lateral edges behind the first propeller 104 or the second propeller 104. The first and second fins 108 can be attached to respective sides of the portion of the lateral edge behind the first propeller 104.

The third fin 108 and the fourth fin 108 are similarly configured at the second propeller 104.

The first fin 108 and the second fin 108 can together form a first pair of endplates, and the third fin 108 and the fourth fin 108 can together form a second pair of endplates. The endplates can help counter wing tip vortex and reduce induced drag force.

Each fin 108 impedes air flow moving over or, alternatively, under, as appropriate, the lateral edge of the respective propeller 104. Impeding such air flow can help impede vortex formation and induced drag along the chord at the respective lateral edge of the aerial vehicle 100. The fin geometry provides a passive means of induced drag reduction and can enable high efficiency high speed flight. Each pair of endplates can impede vortex formation and induced drag along the tip of the short aspect ratio wing directly behind each propeller 104.

The aerial vehicle 100 includes at least one motor 201 and at least one power supply 202 for the first propeller 104, the second propeller 104, the elevator 103, and each of the ailerons 107. A motor 201 and/or a power supply 202 can be housed in the lateral edges behind the propeller(s) 104 and/or a tail segment. Multiple motors and/or power supplies with attendant electrical connectivity can be used.

Where the motor(s) and power suppl(ies) are not housed in a removable body section of the primary wing 101, the aerial vehicle 100 is operational with the body section removed.

Figure 7:
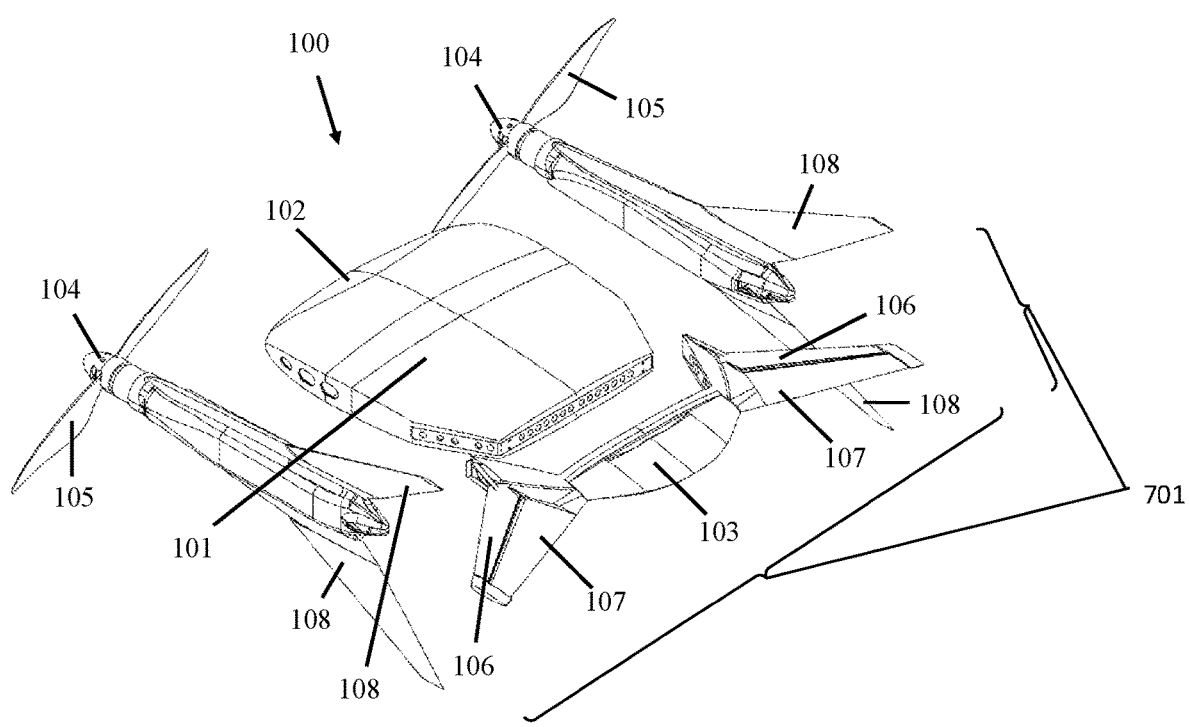
FIG. 7 is a top perspective view of an aerial vehicle, according to another embodiment.

According to an embodiment as shown in FIG. 7, a body section of the primary wing 101 is removable (and an embodiment with the body section omitted or removed is shown in FIG. 8), and aerial vehicle 100 is operable in hovering flight with the body section removed. The body section can be detachable from the first propeller 104 and from the second propeller 104. In some embodiments, the body section is not removable. The body section comprises a removable payload section including the leading edge of the aerial vehicle when connected to the aerial vehicle 100. The body section can be removed to effect long endurance in hover. The body section can form the primary wing 101 from its leading edge up to the tail segment 701.

In an embodiment as shown in FIG. 7, aerial vehicle 100 can be assembled and disassembled. A first propeller 104, a second propeller 104, a tail segment, and/or a body section of a primary wing 101 can be detached from and reattached to respective surfaces of the aerial vehicle 100. This can also facilitate replacement, repair, or transport of any components.

The aerial vehicle 100 can accommodate a payload in the removable payload section. The payload can be weapon(s), suppl(ies), or sensor payload(s). The geometry of the removable payload section can permit the aerial vehicle 100 to fly significantly faster than any alternatives and carry large payloads without changing the outer mold line of the aerial vehicle 100 that defines the external shape and aerodynamic characteristics. According to an embodiment, the aerial vehicle 100 is sacrificial during delivery of the payload. For example, an aerial vehicle 100 carrying munition as the payload can be flown into a target and the aerial vehicle 100 can be destroyed or lost. A Claymore type munition can be delivered to a distance target. The payload may not be deployable mid-air, and the aerial vehicle 100 can be a single use delivery system of the payload instead. The aerial vehicle 100 can be low cost in manufacture and permit its use as a single use delivery system of munition. The aerial vehicle 100 can be configured to allow and not impede operation of munition it is carrying as its payload upon meeting a target. Alternatively, an aerial vehicle 100 carrying a surveillance sensor suite as the payload can be flown on a mission, with the surveillance sensor suite operating to collect data during flight, and returned to base for further use as a surveillance drone or reconfigured as a disposable weapon delivery system, such as by replacing the payload in the removable payload section.

The aerial vehicle 100 can be used to achieve a wider range of operation at higher performance and higher efficiency. The aerial vehicle 100 can allow for the carriage of previously defensive munitions in a new offensive capacity at a speed that fulfils an operational capacity. This further can replace handheld rockets or artillery or light field munitions used by infantry troops.

Figure 4:
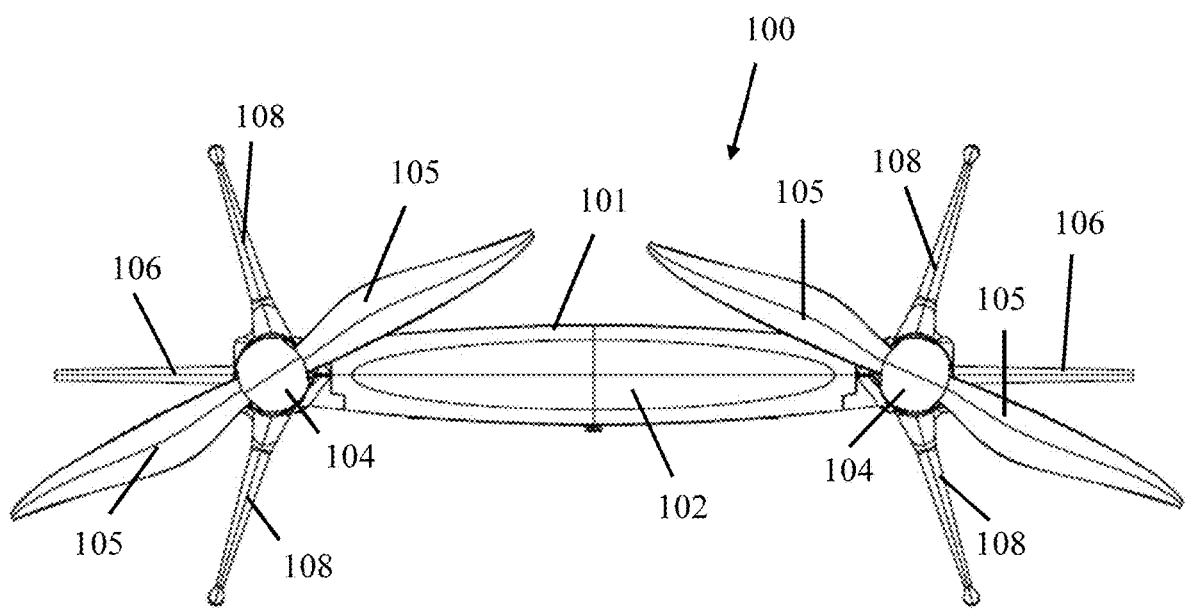
FIG. 4 is a top plan view of the aerial vehicle of FIG. 3.

The first propeller 104 and the second propeller 104 can be rotated counter to the direction of respective wing tip vortices, such as shown by the arrows in FIG. 4. The rotating tips of the propellers 104 can be offset from the respective lateral edges of the aerial vehicle 100. During rotation, the blades 105 can extend beyond the respective lateral edge of the aerial vehicle 100. The rotating propeller 104 wash acts counter to the respective wing tip vortex and can reduce induced drag forces. This can effect active induced drag reduction.

The larger the diameter of a propeller 104 (e.g., rotor), the more efficient it can be in generating thrust for the aerial vehicle 100. This can be particularly true for hovering flight. Also, the larger the diameter the more of the body of aerial vehicle 100 is in the propeller wash. This can be advantageous as it can create an aerial vehicle 100 that cannot stall as the speed of the airflow over the surface is maintained independent of the forward speed of the aerial vehicle 100. The diameter of each propeller 104 and/or respective blades 105 can be selected and configured accordingly.

According to embodiments as shown in FIGS. 1-5 and 7-13, an aerial vehicle 100 is configured to carry a variety of payloads at high speeds and over long distances from a vertical take-off. Accordingly, aerial vehicle 100 may be utilized by military personnel to efficiently carry out diverse missions at a safe distance from known or potential threats. Further, due to its vertical take-off capability, aerial vehicle 100 may be deployed from tight spaces and with greater discretion. Aerial vehicle 100 may also be put to recreational and commercial uses. Aerial vehicle 100 may provide users with a fast method of transporting goods unaffected by, for example, traffic lights and congestion on roadways. Due to its modularity, permissive of the replacement of individual components upon damage or dysfunction, aerial vehicle 100 may provide a user with a cost-friendly, low-maintenance alternative.

Aerial vehicle 100 may be constructed from materials which provide sufficient mechanical strength and durability to withstand adverse weather conditions and perform reliably over time. According to an embodiment, aerial vehicle 100 may be constructed of aluminum, thermoplastics, carbon-reinforced composites or a combination of suitable materials. Manufacturing costs and overall weight of aerial vehicle 100 may be considerations informing the choice of materials and construction technique and design choices of aerial vehicle 100.

Figure 5:
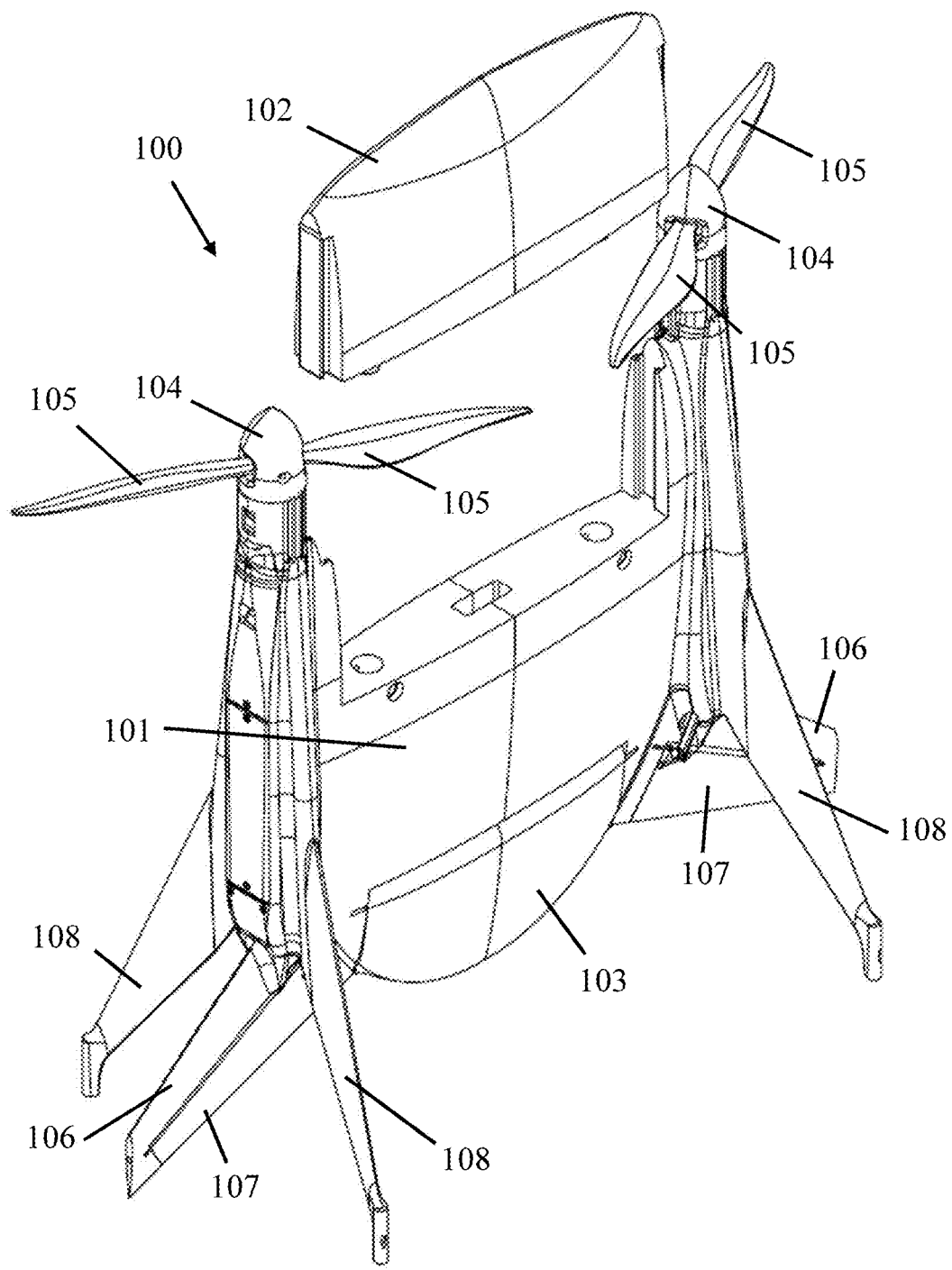
FIG. 5 is right side perspective view of the aerial vehicle of FIG. 1 with a payload section detached from the aerial vehicle.
Figure 6A:
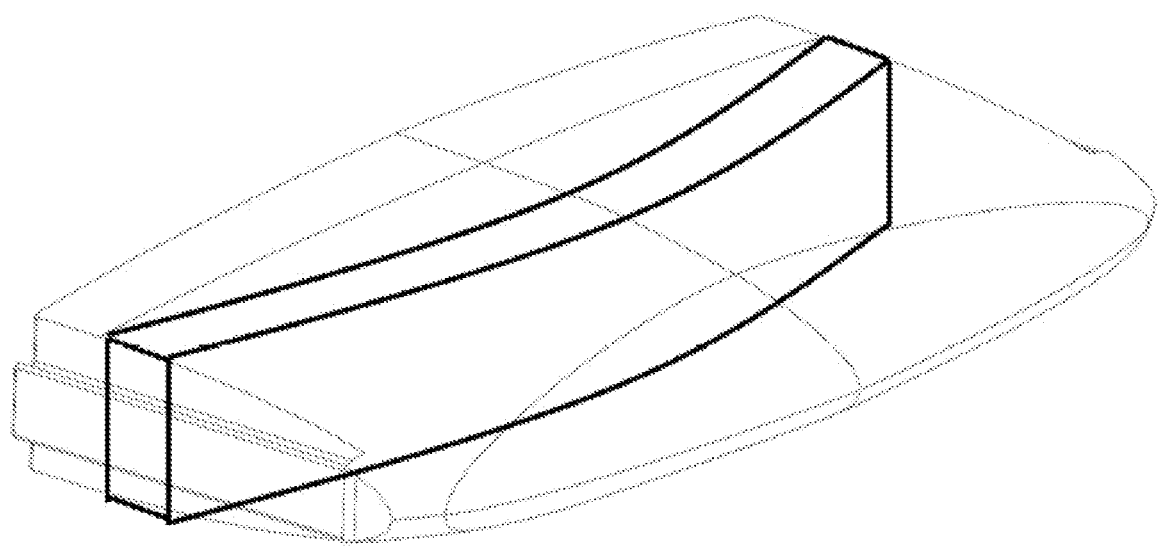
FIG. 6A is a perspective view of a Claymore-type munition housed within a payload section.
Figure 6B:
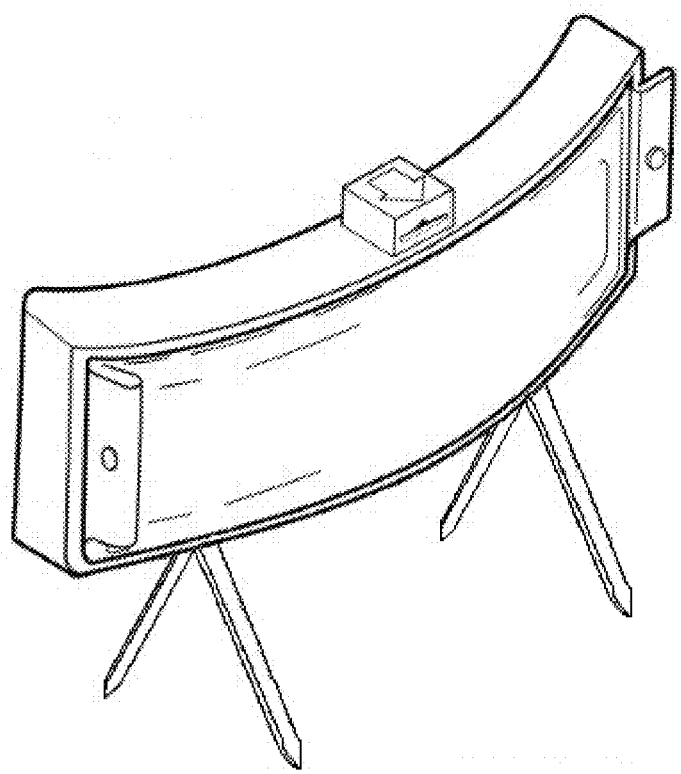
FIG. 6B is a perspective view of a Claymore-type munition.
Figure 10:
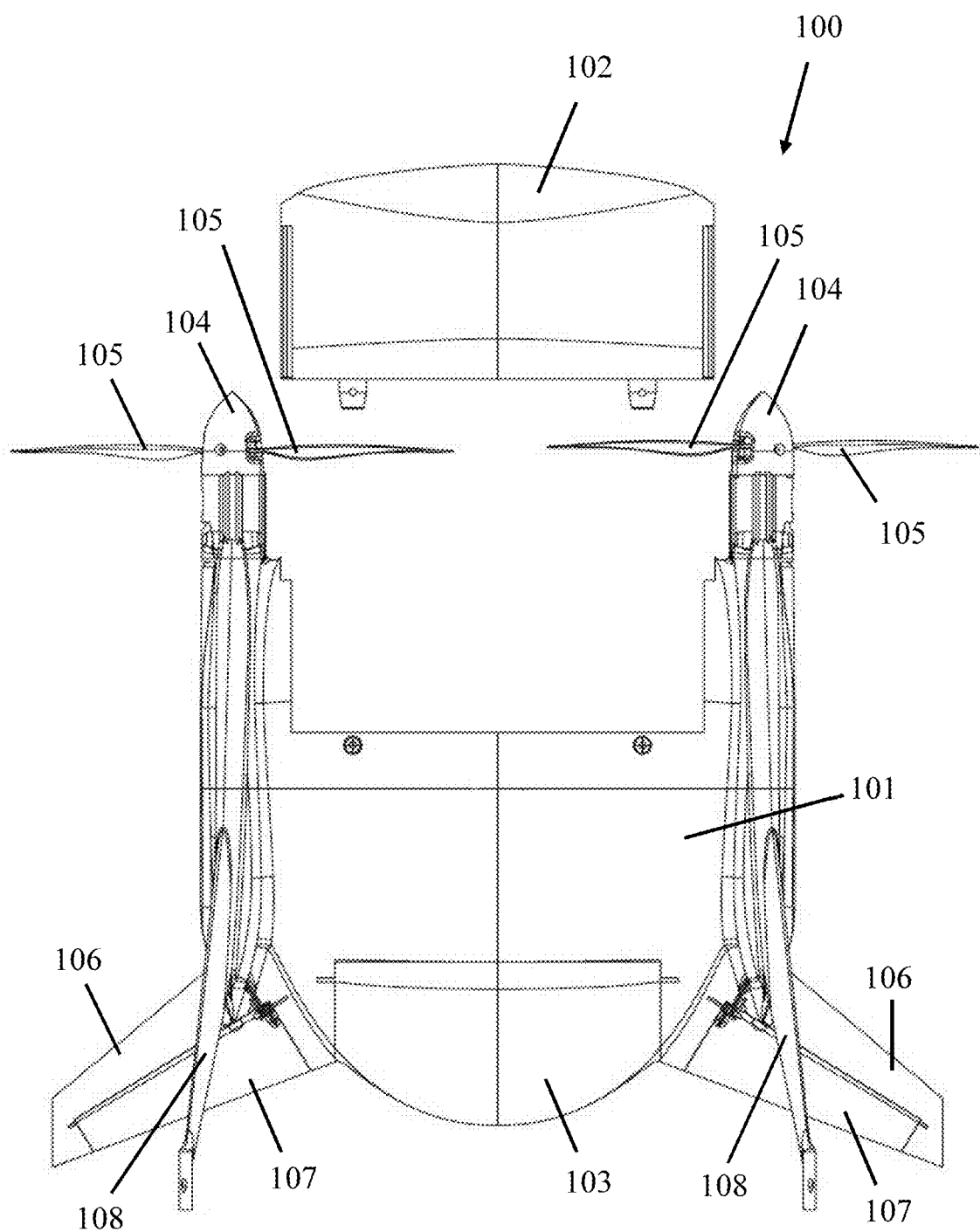
FIG. 10 is a back view of the aerial vehicle of FIG. 1 with a payload section detached from the aerial vehicle.
Figure 11:
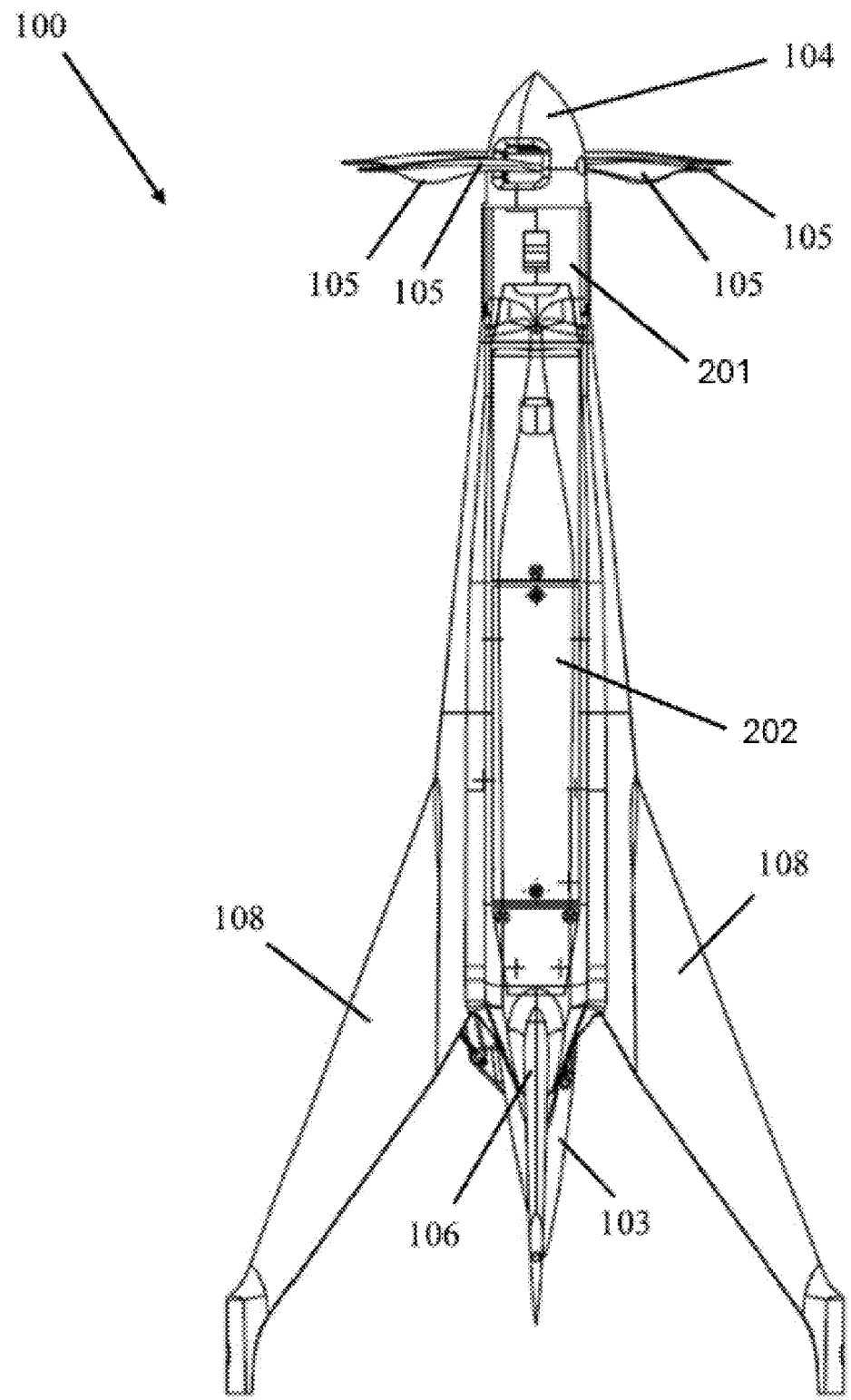
FIG. 11 is a left side view of the aerial vehicle of FIG. 1.
Figure 12:
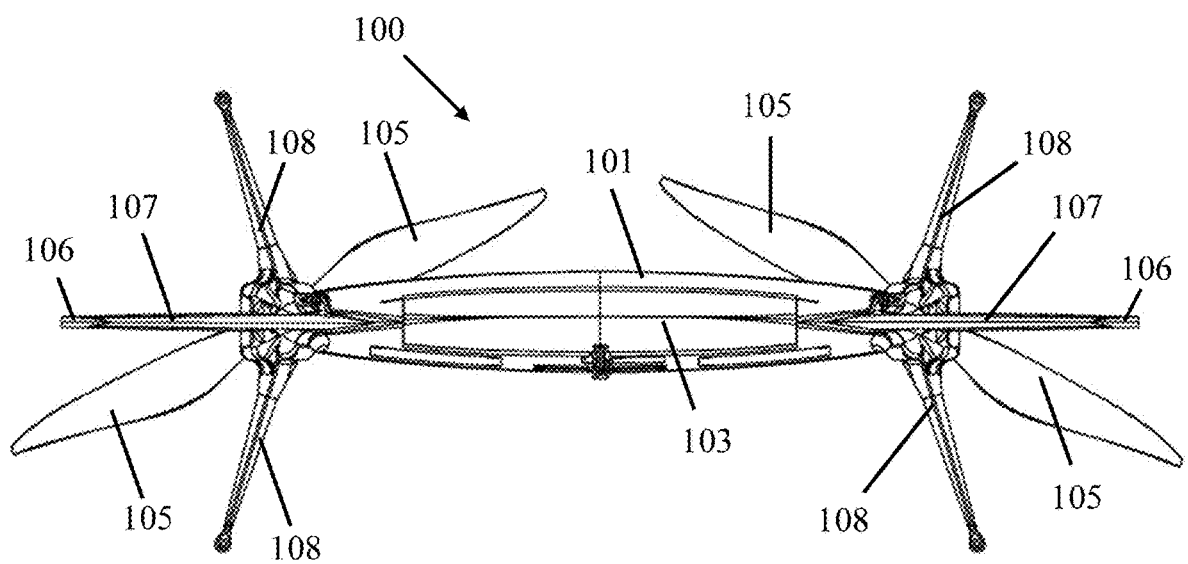
FIG. 12 is a bottom plan view of the aerial vehicle of FIG. 3.
Figure 13:
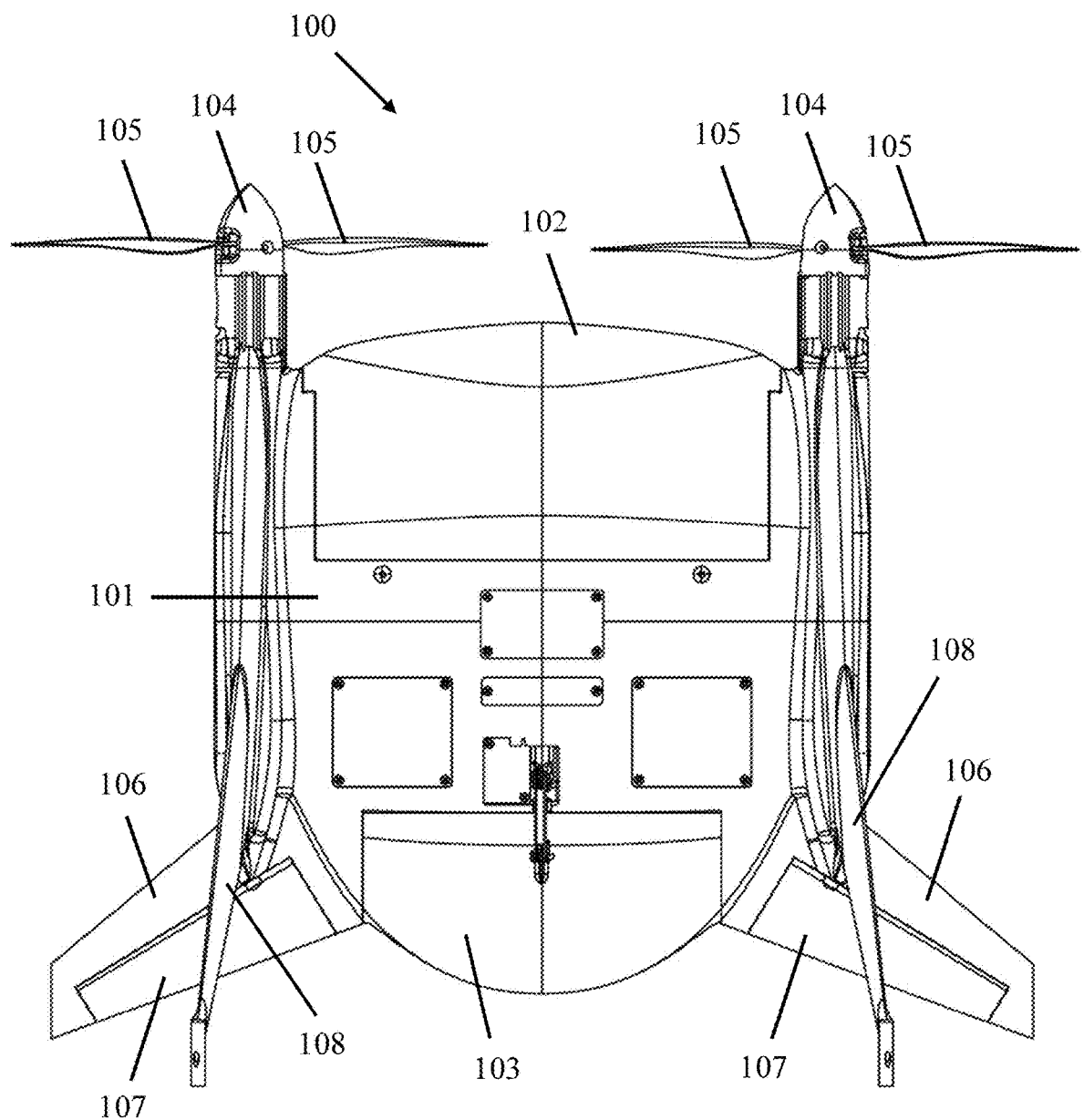
FIG. 13 is a back view of an aerial vehicle, according to an embodiment.

Aerial vehicle 100 shown in FIG. 1 includes a primary wing 101 wing-fuselage. According to an embodiment as shown in FIGS. 1-3, 5, 7, 10 and 13, primary wing 101 has an aspect ratio of 1:1. The outer mold line and internal volume of primary wing 101 may vary. Due to its relatively small wingspan and resulting low volume-to-weight and weight-to-size ratios, aerial vehicle 100 may be easy to handle and to carry, enhancing its utility in, especially, a tactical military application. According to an embodiment, primary wing 101 may have convex leading and trailing edges. As shown in FIGS. 4, 5, and 12, primary wing 101 may taper toward a pair of lateral edges of primary wing 101. According to an embodiment as shown in FIGS. 1-7, 10 and 13, primary wing 101 further comprises a payload module 102. As shown in FIGS. 6A and 6B, payload module 102 may be molded to accommodate within it a Claymore mine. According to an embodiment, as shown in FIGS. 1-7, 10 and 13, payload module 102 forms a leading edge of primary wing 101. As shown in FIGS. 5, 6 and 10, payload module 102 may be detachable from primary wing 101. As a result, a payload of aerial vehicle 100 may be easily and quickly exchanged. Payload module 102 may be removably attached to primary wing 101 via a twist-lock mechanism. In other embodiments, other mechanisms may be used to removably attach payload module 102 to primary wing 101, for example, a snap-fit or toggle latch mechanism. Ease of use, strength and durability may inform the choice of a suitable attachment mechanism for payload module 102.

Aerial vehicle 100 as shown in FIG. 1 also includes an elevator 103. As shown in FIGS. 1-3, 5, 7, and 10-13, elevator 103 is disposed along a trailing edge of primary wing 101. According to an embodiment, elevator 103 constitutes a majority of the trailing edge of primary wing 101. Elevator 103 may, in hovering flight, provide forward and backward translational control of aerial vehicle 100 within the horizontal plane. In forward flight, elevator 103 may provide pitch control of aerial vehicle 100. According to another embodiment, as shown in FIGS. 7 and 8, elevator 103 is embedded within a detachable tail segment 701 of primary wing 101, said tail segment 701 coupled to pair of stabilizing wings 106. A variety of attachment means may be used to couple tail segment 701 to one or both of primary wing 101 and pair of stabilizing wings 106. For example, tail segment 701 may be coupled to primary wing 101 and pair of stabilizing wings 106 via a snap-fit mechanism or quick release mechanism. In other embodiments, one or more alternative attachment means may be used to couple tail segment 701 to one or both of primary wing 101 and first wing 106 and second wing 106, the first wing 106 and the second wing 106 together comprising a pair of stabilizing wings 106.

Aerial vehicle 100 further includes a pair of propellers 104, each comprising at least a blade 105. The pair of propellers 104 may be fixed-pitch or controllable-pitch propellers. According to an embodiment as shown in FIGS. 1-5 and 7-13, pair of propellers 104 each comprise two blades 105. As shown in FIGS. 1-5 and 7-13, pair of propellers 104 may be disposed on opposite lateral edges of primary wing 101. The propellers 104 can extend beyond the leading edge of the aerial vehicle 100 and to a portion near the trailing edge of the aerial vehicle 100 such as at a position of a respective wing (either first wing 106 or second wing 106). According to an embodiment, as shown in FIG. 7, pair of propellers 104 are removably coupled to both primary wing 101 and pair of stabilizing wings 106. Pair of propellers 104 may be coupled to primary wing 101 and pair of stabilizing wings 106 via a snap-fit mechanism. In other embodiments, one or a combination of other attachment mechanisms may be used. The choice of mechanism for coupling pair of propellers 104 to primary wing 101 and pair of stabilizing wings 106 may be informed by considerations including strength and durability. According to an embodiment, each of blades 105 may each rotate in a direction counter to a wing tip vortex of primary wing 101. Blades 105 may thereby reduce induced drag forces on aerial vehicle 100. Blades 105 may each have a length of at least half of a width of primary wing 101 defined by the greatest distance between the pair of lateral edges of primary wing 101. Consequent to their large size relative to aerial vehicle 100, blades 105 may create low disk loading and high efficiency in vertical/hovering flight. According to an embodiment, primary wing 101 may be entirely within a propeller wash of pair of propellers 104 and is blown (the velocity of the air over the lifting surface can be largely independent of the forward speed of the aerial vehicle 100). A fully blown lifting surface can prevent the onset of stall in some cases and aerial vehicle 100 can be controllable through a transition between hovering and forward flight. Fine differential thrust control of pair of propellers 104 in forward flight may provide control of aerial vehicle 100 in yaw. In hovering flight, fine differential thrust control of pair of propellers 104 may provide sideways translational control of aerial vehicle 100 in a horizontal plane. The use of a single pair of propellers 104 for each of vertical take-off, hovering flight and forward flight may limit drag on aerial vehicle 100 and produce a thrust-to-weight ratio greater than 1, enabling both high speed flight and high dash speeds.

Aerial vehicle 100 as shown in FIG. 1 further includes a pair of stabilizing wings 106, each comprising an aileron 107. According to an embodiment as shown in FIGS. 1-5, 7 and 10-13, pair of stabilizing wings 106 emanate from opposite lateral edges of a rearward portion of primary wing 101. According to an embodiment, as shown in FIGS. 1-3, 5, 7-10 and 13, pair of stabilizing wings 106 are back swept wings. Each aileron 107 may provide roll control of aerial vehicle 100 in forward flight and rotational control about a vertical axis of aerial vehicle 100 in hovering flight. According to an embodiment, as shown in FIGS. 1-3, 5, 7-10, 12 and 13, each aileron 107 may constitute a majority of a trailing edge of each of pair of stabilizing wings 106.

Aerial vehicle 100 further includes at least four fins 108, wherein at least four fins 108 are affixed to each of the pair of propellers 104 and configured to act as endplates primary wing 101. According to an embodiment, as shown in FIGS. 4, 7 and 12, at least two fins of the at least four fins 108 are affixed to each of the pair of propellers 104. At least four fins 108 may taper away from a point of attachment on pair of propellers 104. According to an embodiment, the at least two fins are disposed on opposite faces of each of the pair of propellers 104, as shown in FIGS. 4, 7 and 12. According to a further embodiment, the at least two fins extend backward along each of the pair of propellers 104. As shown in FIGS. 3, 9-11 and 13, at least four fins 108 may extend past a pair of wing tips of pair of stabilizing wings 106. At least four fins 108 may help counter a wingtip vortex of primary wing 101 and reduce induced drag force on aerial vehicle 100.

Aerial vehicle 100 further includes a motor and a power supply. According to an embodiment, the motor and the power supply may be housed in one or more of pair of stabilizing wings 106, propellers 104, and tail segment 701 of primary wing 101. The motor may be, for example, a brushless DC motor or brushed DC motor. The choice of motor may be informed by intended applications for aerial vehicle 100, durability, weight and power. The power supply may comprise, for example, one or a combination of batteries, internal combustion engines and hydrogen fuel cells.

According to an embodiment, an aerial vehicle as shown in FIG. 8 is assembled by connecting a pair of propellers to a pair of stabilizing wings 106 connected to a detachable tail segment 701, wherein embedded within the tail segment is an elevator 103. According to another embodiment, aerial vehicle 100 has a primary wing 101 that is further connected to the pair of propellers, the pair of stabilizing wings and the tail segment.

Aerial vehicle 100 can be an unmanned aerial vehicle. Aerial vehicle 100 can be a tail-sitting vertical takeoff and landing unmanned aerial vehicle able to transition between vertical (hover) (see FIG. 1) and forward flight (see FIG. 2) with a body shape configured for aerodynamic travel and accommodation of exchangeable payloads, high interior volume, small wingspan, mechanical simplicity, passive and active aerodynamic drag features, and inherent aerodynamic stability in hover and forward flight. The aerial vehicle 100 can have a small aspect ratio wing with higher power to weight ratio. The aerodynamic nature of the short aspect ratio wing which is not critical for wing bending combined with the propeller position and the cancellation effect of the counterrotating propeller-wash on the wing tip vortex the aerial vehicle 100 can fly in conventional flight modes (without vertical take-off or hover) at weights significantly higher than the maximum design weight for vertical takeoff and landing flight.

Figure 14:
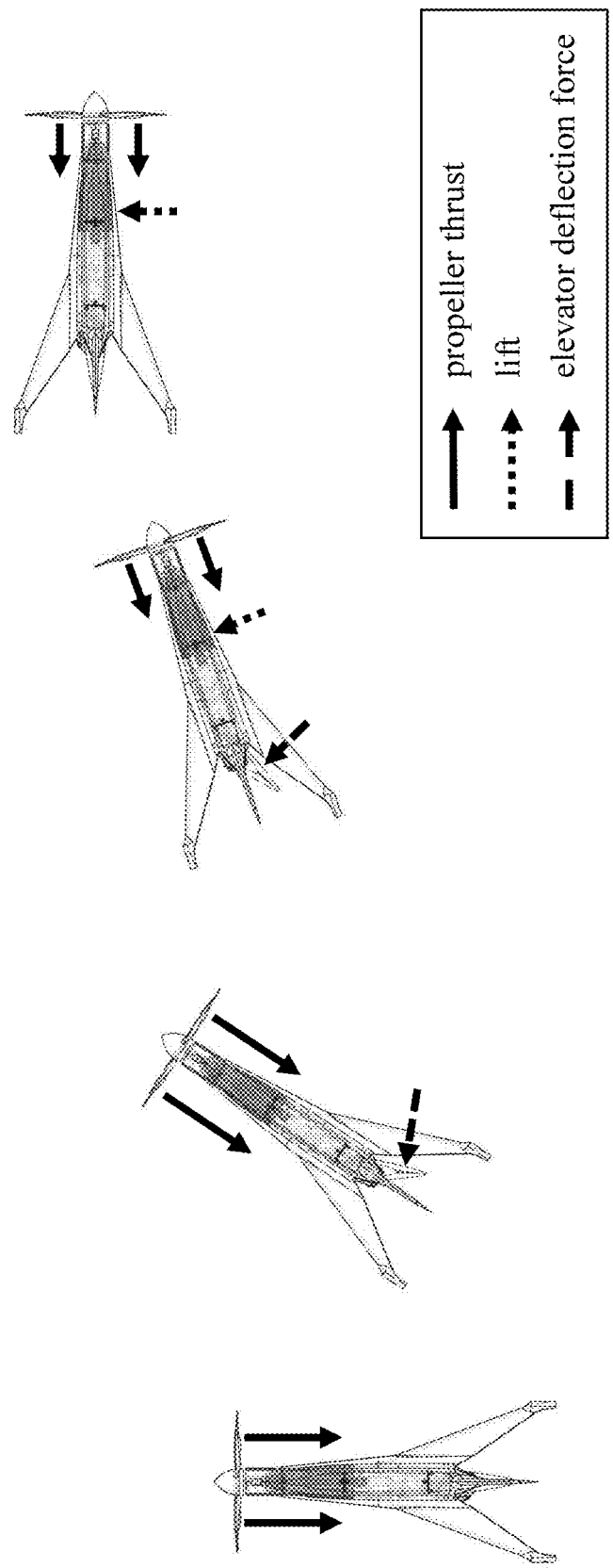
FIG. 14 illustrates an aerial vehicle, according to an embodiment, transitioning from hovering to forward flight.

As shown in FIG. 14, an aerial vehicle 100 may transition from hovering to forward flight, as well as from forward flight to hovering flight. According to an embodiment, thrust from a pair of propellers suspends the aerial vehicle in hovering flight. Deflection of an elevator on a tail section of the aerial vehicle initiates a transition from hovering to forward flight. The deflection of the elevator causes lateral displacement of the tail section of the aerial vehicle. Resultantly, the thrust from the pair of propellers gains a lateral component, and the aerial vehicle picks up speed relative to a surface below. As the aerial vehicle continues to tilt in response to the lateral displacement of the tail section, forward speed increases, the thrust from the pair of propellers gains a greater lateral component, and a wing of the aerial vehicle begins to generate lift. As forward speed further increases, the aerial vehicle stabilizes in forward flight and the elevator may be returned to a neutral position. In forward flight, all of the lift is created by the wing and the thrust from the pair of propellers propels the unmanned aerial vehicle forward.

Various embodiments of the invention have been described in detail. Since changes in and or additions to the above-described best mode may be made without departing from the nature, spirit or scope of the invention, the invention is not to be limited to those details but only by the appended claims.

What is claimed is:

1. An aerial vehicle comprising:
   a first propeller and a second propeller, each comprising at least two blades and each disposed on opposite lateral edges of a body;
   a tail segment extending laterally from the first propeller to the second propeller and forming a trailing edge of the aerial vehicle, the tail segment including:
   an elevator; and
   a first wing and a second wing, each of the first wing and the second wing including an aileron;
   four fins affixed to lateral edges of the first propeller and the second propeller aft of the blades of the first propeller and the second propeller and configured as endplates;
   the body extending from the first propeller to the second propeller, the body being configured as a blown primary lifting surface to generate lift along an entire lateral extension between the first propeller and the second propeller;
   a motor; and
   a power supply.

2. The aerial vehicle of claim 1, wherein the body includes a removable payload section forming a leading edge of the primary lifting surface.

3. The aerial vehicle of claim 2, wherein the body is detachable from the first propeller and from the second propeller.

4. The aerial vehicle of claim 2, wherein the removable payload section is configured to accommodate at least one directional fragmentation mine.

5. The aerial vehicle of claim 1, wherein each of the fins are positioned to support the aerial vehicle in a tail-sitting configuration.

6. The aerial vehicle of claim 1, wherein the motor and the power supply are housed in the first propeller or the second propeller.

7. The aerial vehicle of claim 1, wherein the first propeller and the second propeller are detachably attached to the tail segment.

8. The aerial vehicle of claim 1, wherein the first wing and the second wing each are back-swept wings.

9. The aerial vehicle of claim 1, wherein two of the four fins are disposed on opposite faces of the first propeller and wherein another two of the four fins are disposed on opposite faces of the second propeller.

10. The aerial vehicle of claim 1, wherein an aspect ratio of a wingspan of the aerial vehicle to the chord is less than 2.0.

* * * * *